United States Patent [19]
Gorman et al.

[11] Patent Number: 5,636,145
[45] Date of Patent: Jun. 3, 1997

[54] PROGRAMMABLE MULTIFUNCTION SPEEDOMETER

[75] Inventors: Carl F. Gorman, Preston; Richard Wraight, Norwich, both of Conn.

[73] Assignee: Thomas J. Faria Corp., Uncasville, Conn.

[21] Appl. No.: 380,386

[22] Filed: Jan. 30, 1995

[51] Int. Cl.⁶ .................................. G01P 1/08; G01P 1/12
[52] U.S. Cl. .................... 364/565; 364/424.04; 340/441
[58] Field of Search .................... 364/424.01, 424.05, 364/431.07, 565, 424.03, 424.04, 164, 165; 340/936, 441

[56] References Cited

U.S. PATENT DOCUMENTS

| | | | |
|---|---|---|---|
| 4,140,970 | 2/1979 | Graziano | 324/166 |
| 4,167,699 | 9/1979 | Baker | 324/171 |
| 4,399,354 | 8/1983 | Schaeffer | 377/26 |
| 4,742,297 | 5/1988 | Heaton et al. | 324/166 |
| 4,839,834 | 6/1989 | Omae et al. | 364/565 |
| 4,862,395 | 8/1989 | Fey et al. | 364/561 |
| 4,926,331 | 5/1990 | Windle et al. | 364/424.04 |
| 4,992,730 | 2/1991 | Hagiya | 324/160 |
| 5,019,773 | 5/1991 | Sugiura et al. | 324/166 |
| 5,105,150 | 4/1992 | Liu | 324/160 |
| 5,267,159 | 11/1993 | O'Neall | 364/424.04 |

Primary Examiner—Michael Zanelli
Attorney, Agent, or Firm—Hopgood, Calimafde, Kalil & Judlowe

[57] ABSTRACT

A programmable multifunction speedometer, wherein a sensor responding to drive train motion provides input pulses related to speed of vehicle travel, the pulses being input to a programmable microprocessor that has been programmed at least to drive an instantaneous and continuously correct display of speed, the microprocessor having a first input device for receiving programming from an external source, and a second input device for modifying programming during speedometer operation. The programming includes a self-calibrating mode operated by a manual switch to start and stop a counted succession of the input pulses.

20 Claims, 10 Drawing Sheets

PROGRAMMABLE MULTIFUNCTION SPEEDOMETER

BACKGROUND OF THE INVENTION

The invention relates to a programmable multifunction speedometer having particular suitability for use in motor vehicles.

In an electronic programmable speedometer, the speedometer receives a signal from a sensor, i.e., a series of electrical pulses which are proportional to the speed of the vehicle. By measuring the period or frequency of the signal, vehicle speed is determined. Although a relatively simple calculation, the number of pulses per unit distance must be precisely calibrated to the mechanical characteristics of the vehicle, in particular, variables such as tire size, axle gear ratio, and the number of intermediate gear teeth.

Calibration of conventional speedometers is done using linear equations which factor in each of the vehicle's mechanical characteristics. By computing the solution to the equation, a number is obtained which, when looked up in a table, provides appropriate programming for the vehicle. Programming is then accomplished by selected positioning of small switches located on the back of the speedometer. The size and location of these switches, however, has made them difficult to access and read. Also, the number of programming possibilities is limited by the number of switches which may be practically located on the device.

Conventional programming must therefore be done prior to speedometer installation. When vehicle characteristics, e.g., the tire size or gear ratio, are modified subsequently, the speedometer must be physically removed from the vehicle and reprogrammed, or replaced with a new speedometer with appropriate calibration.

BRIEF STATEMENT OF THE INVENTION

It is therefore an object of the invention to provide a multifunction electronic speedometer which is readily programmable before installation and readily reprogrammable thereafter.

A specific object is to provide a speedometer which is programmable for use in any motor vehicle.

Another specific object is to provide a device that may function both as a speedometer and a tachometer in a variety of different motor vehicles.

Still another specific object is to allow recalibration of a speedometer during its use in any motor vehicle.

The invention meets these objectives by providing a programmable multifunction speedometer. At least one sensor responding to drive train motion provides input pulses related to speed of vehicle travel, the pulses being input to a programmable microprocessor that has been programmed at least to drive an instantaneous and continuously correct display of speed, the microprocessor having a first input device for receiving programming from an external source, and a second input device for modifying programming during speedometer operation.

Programming also provides a speedometer, including odometer, tachometer and hour-meter functions, as well as a reprogrammability or self-calibration feature. Microprocessor programming, in addition, may provide record and replay functions, two-speed axle input, overspeed output, divided speed signal output and service interval indication for use in any vehicle giving off a pulse signal proportional to speed. A meter is also provided having a dial marked with speed and/or RPM units and is equipped with two coils which drive a dial pointer. Numerical information, e.g., speed, RPM, hour-meter, distance, and text messages to the user, e.g., SERVICE, PROGRAMr RUN, are shown on an alpha numeric display (ALNUD), liquid crystal display (LCD), a light emitting diode display (LED), and/or the like.

BRIEF DESCRIPTION OF THE DRAWINGS

The invention will be described for a preferred embodiment., in conjunction with the accompanying drawings, in which.

The same numerals are used throughout the various figures to designate similar elements.

Still other objects and advantages of the present invention will become apparent from the following description of the preferred embodiments.

DETAILED DESCRIPTION OF THE PREFERRED EMBODIMENTS

Referring now to the drawings and more particularly to FIGS. 1–13, there is shown generally a programmable multifunction speedometer system 10, in accordance with one aspect of the present invention. As shown in FIG. 4, at the kernel of the system is a programmable microprocessor 20 having a first input device 30 for receiving programming from an external source, and a second input device 40 for modifying programming during speedometer operation.

Generally speaking, internal programming of the microprocessor and its reprogrammable data memory 22 manage all functions for generating, recording and displaying information. This includes, for example, a meter 60 having a dial 64 with pointer 65, an alpha numeric display (ALNUD) 70, and a memory storage device (EEPROM) 22. Preferably, all operator input is provided through use of a single mode switch 40.

Display of numerical information, e.g., speed, RPM, hour-meter, distance, and text messages to the user, e.g., SERVICE, PROGRAM, RUN, are shown on ALNUD 70, a liquid crystal display (LCD) 73, a light emitting diode display (LED) 74, and/or the like.

Programming also provides a speedometer, including odometer, tachometer and hour-meter functions, as well as a self-calibration feature. Microprocessor programming, in addition, may provide record and replay functions, two-speed axle ratio input 46, overspeed alarm signal output 92, divided speed signal output 52, and service interval indication for use in any vehicle giving off a pulse signal proportional to vehicle speed.

A sensor 50 responding to drive train motion, such as drive-shaft rotation, transmission gear rotation or wheel rotation, provides input pulses related to speed of vehicle travel, the pulses being input to the microprocessor. The microprocessor controls the various functions of the speedometer and is programmed at least to drive an instantaneous and continuously correct display of speed.

More particularly, a transducer (not shown) converts drive train motion into an electrical pulse train. The pulse train voltage is filtered and shifted for compatibility by buffer 51, and input to the microprocessor which calculates the angle which speedometer dial pointer 65 must move in order to accurately indicate vehicle speed. Based upon the angle, the microprocessor generates two signals with duty cycles proportional to the SINE and COSINE of the angle. The signals are sent to an amplifier/controller 63 which drives a pair of coils 61, 62 oriented at right angles to one another. At least one amplifier of amplifier/controller 63 at each coil end causes the coils to move the pointer to the desired angle.

A meter return magnet, such as a permanent magnet, is associated with meter 60 for maintaining the pointer at zero when the power is "OFF" and when the vehicle is at rest. This magnet creates a magnetic field, the magnitude of which is measured during installation as part of the calibration process, and stored in memory associated with the microprocessor. As those skilled in the art will appreciate, this magnetic field introduces non-linearity to pointer movement. To nullify its effects, the field measurements are added to the pointer movement signal during speedometer operation, yielding relatively linear pointer movement.

Figure 2:
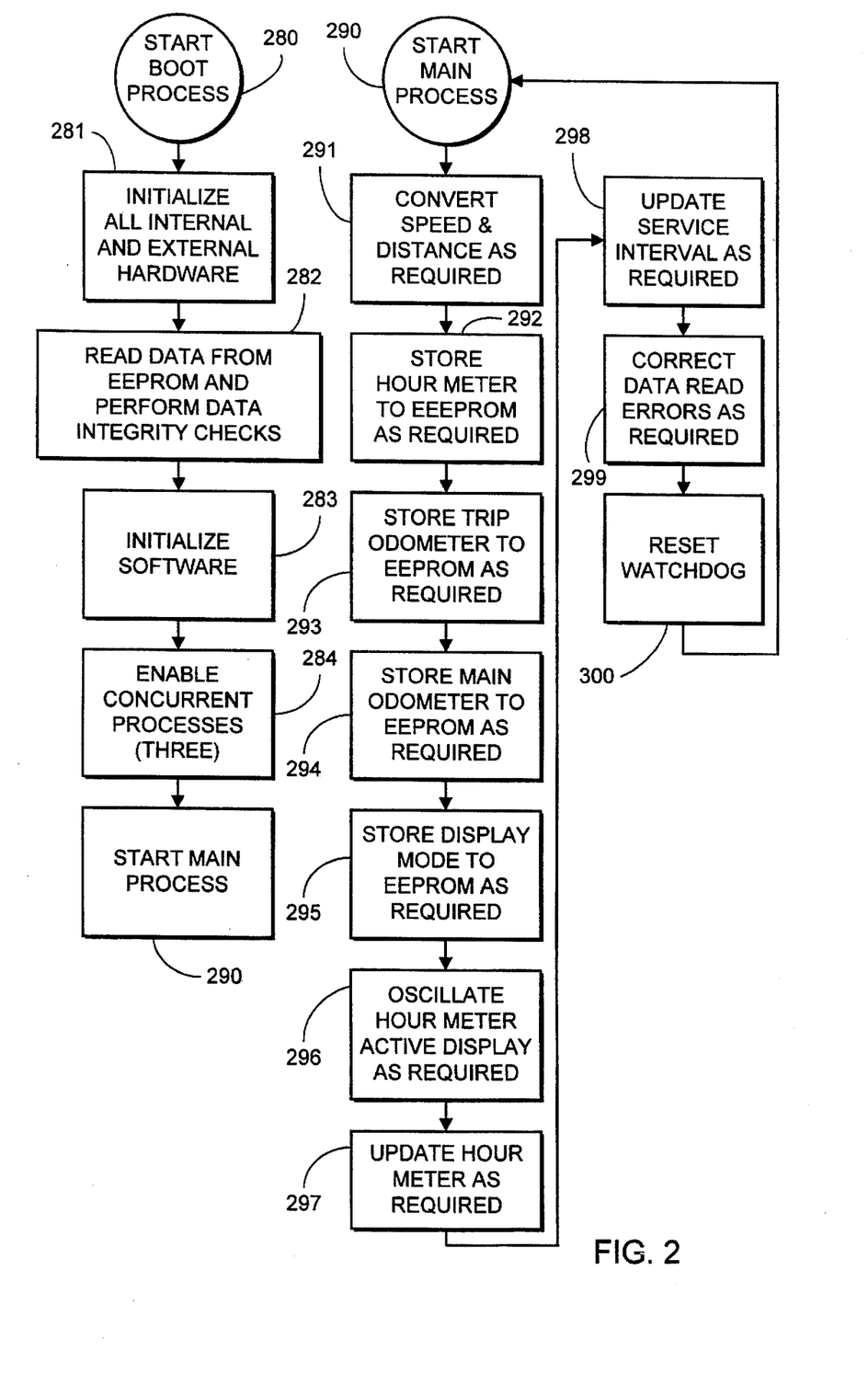
FIG. 2 is a simplified flow diagram of a programming sequence for the speedometer of FIG. 1.
Figure 2A:
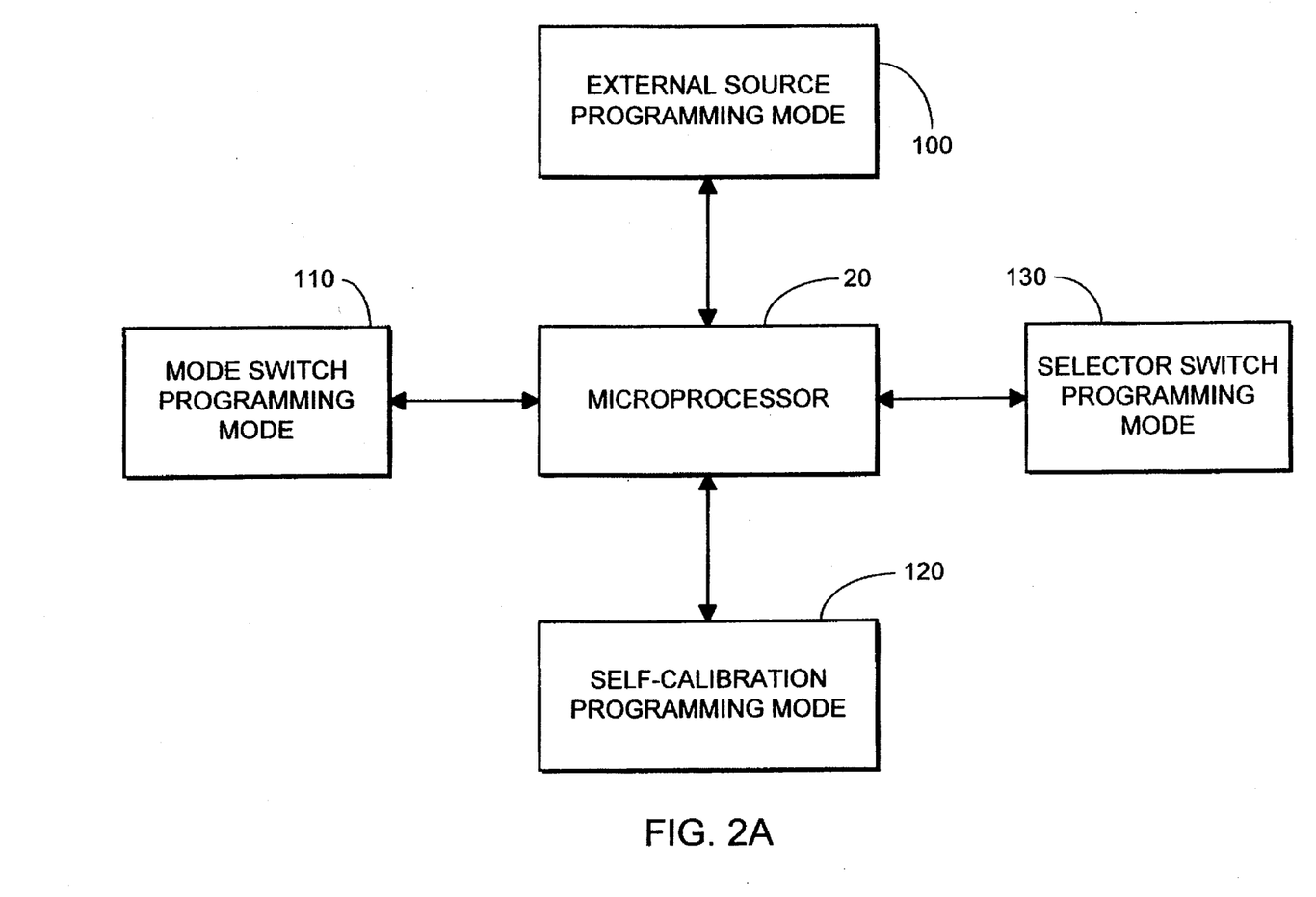
FIG. 2A is a simplified programming tree for the speedometer of FIG. 1.
Figure 2B:
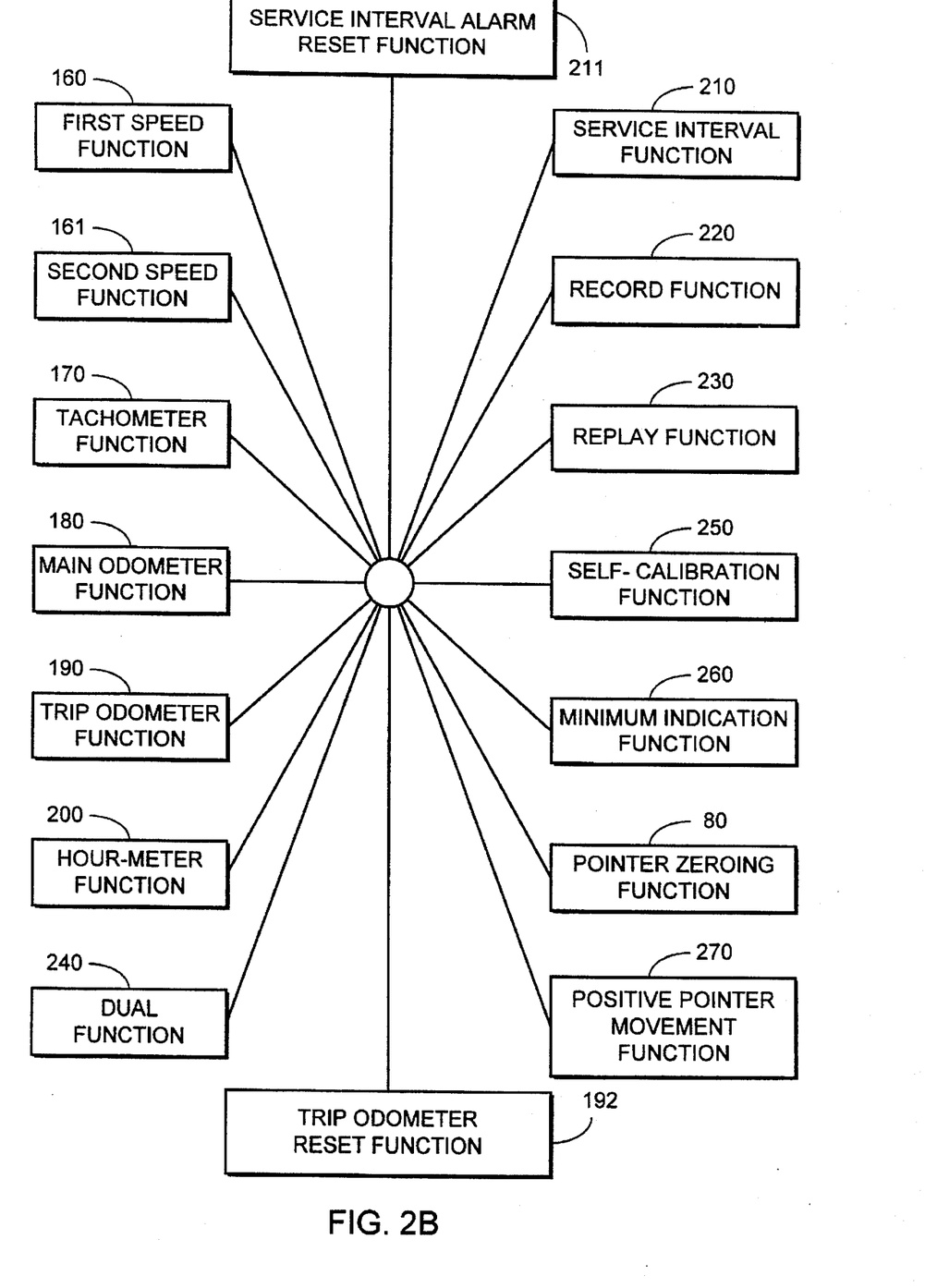
FIG. 2B is a diagram showing microprocessor functions of the speedometer in FIG. 1.

The speedometer dial pointer is also provided with a pointer zeroing function 80 (FIG. 2B). During factory calibration, any difference between pointer power zero and the actual dial reading of zero is measured and stored for later use in all speed indications.

Also at that time, a table of linearity offsets is stored in memory associated with the microprocessor for use during operation, one offset for each four degree interval of pointer movement. The offsets are added (or subtracted) from the actual measured value upon each pointer update. Determination of which pointer offset is appropriate is based on where the pointer should be located, theoretically, on the dial. The ability to use offsets, as provided by the present invention, allows the installer to compensate for any non-linearity effects from system components.

As shown in FIG. 2A, a first and primary method 100 of microprocessor programming is done via first input device 30. In accordance with one embodiment of the present invention, a probe 30 from an external source, e.g., a general purpose personal computer, is engaged with a receptacle of the input device. Upon execution of operating system software on the computer, selected programming and calibration data are loaded into microprocessor memory. This programming and data preferably contain all of that required for speedometer operation and its multiple functions, and is of a type which may remain permanently in microprocessor memory.

While the present invention is described in conjunction with a probe and computer input device, other methods of inputting information from an external source will be appreciated by those skilled in the art giving consideration to the purpose for which the present invention is intended.

A second programming mode 110 is provided, preferably upon installation of the speedometer and its connection to a power source such as a vehicle battery. System power is turned "ON" via the power supply circuit of FIG. 13 using a separate manual activation switch (not shown) such as a vehicle ignition switch. The operator may then set or select, using single mode switch 40 and ALNUD 70, the pulses per unit distance (PPD), a service interval, and an overspeed alarm activation set point.

Simultaneous activation of the power switch and the mode switch displays "Pgn PPD" on the ALNUD. Upon release of the mode switch, the current PPD is displayed as a multidigit number. A digit which is active for modification is indicated, e.g., by flashing or the like. Thereafter, relatively brief depressions of the mode switch, such as those less than about 1 second, cause the active digit to move about 1 increment. To activate the next digit, and so forth, longer depressions, e.g., about 4 to 8 seconds, are made. Substantially longer depressions, e.g., greater than about 8 seconds, loads the displayed number into microprocessor memory.

Upon depressing the mode switch 8 or more seconds in the Pgn PPD, the current service interval is displayed as a multidigit number on the ALNUD. This number is modified in the manner described above using the mode switch.

When the mode switch is again depressed for about 8 or more seconds, the service interval is set and the overspeed alarm set point is displayed on the ALNUD. This number may be modified as desired using the mode switch. When the new set point has been entered, the speedometer automatically resumes normal operation.

A third or self-programming mode 120 is also provided during speedometer operation. Using the mode switch and ALNUD, the operator may calibrate the speedometer to any vehicle installation. Self-calibration has been found particularly useful where physical characteristics of the new vehicle, such as axle ratio and tire size, are unknown. Functions facilitated by this programming mode are set forth in more detail below.

Figure 1:
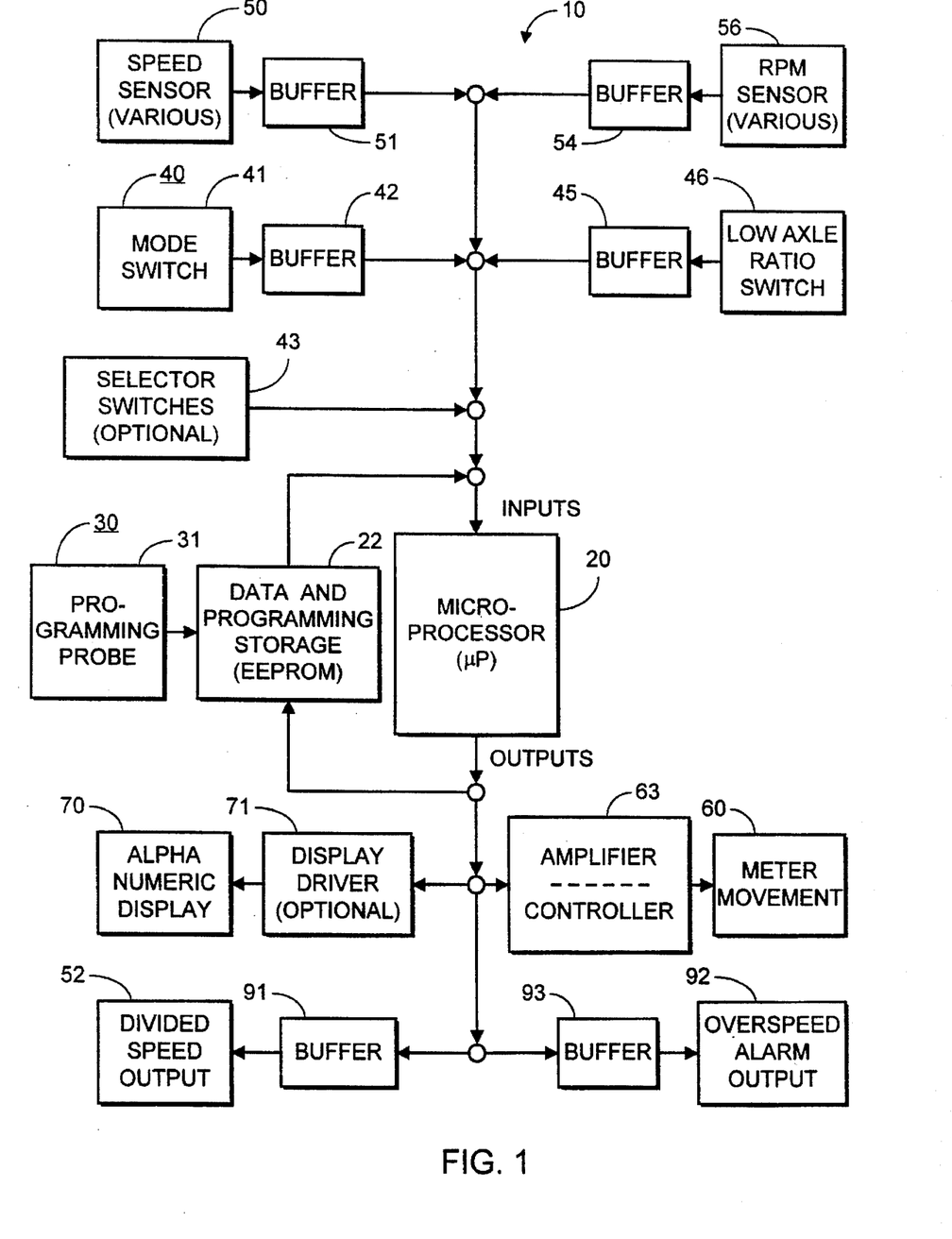
FIG. 1 is a simplified flow diagram of a programmable multifunction speedometer to which the present invention is illustratively applicable.

During the first programming mode, microprocessor programming can provide an optional fourth and final programming method 130 which, in accordance with one aspect of the present invention, allows the operator to set the PPD using one or more multi-position selector switches 43, as shown in FIG. 1. An appropriate number of switches are provided such as on the rear of the speedometer to enable programming by this method. Linear equations are provided which factor in each mechanical characteristic of a selected vehicle. By computing the solution to the equation, a number is obtained which is looked up in a table and provides the appropriate combination of switch positions for the vehicle. Further details of programming in this manner are known by those skilled in the art and further explanation is believed unnecessary for illustration of the present invention.

To exit a programming mode with no data saved, the power activation switch is simply turned to the "OFF" position.

Figure 3:
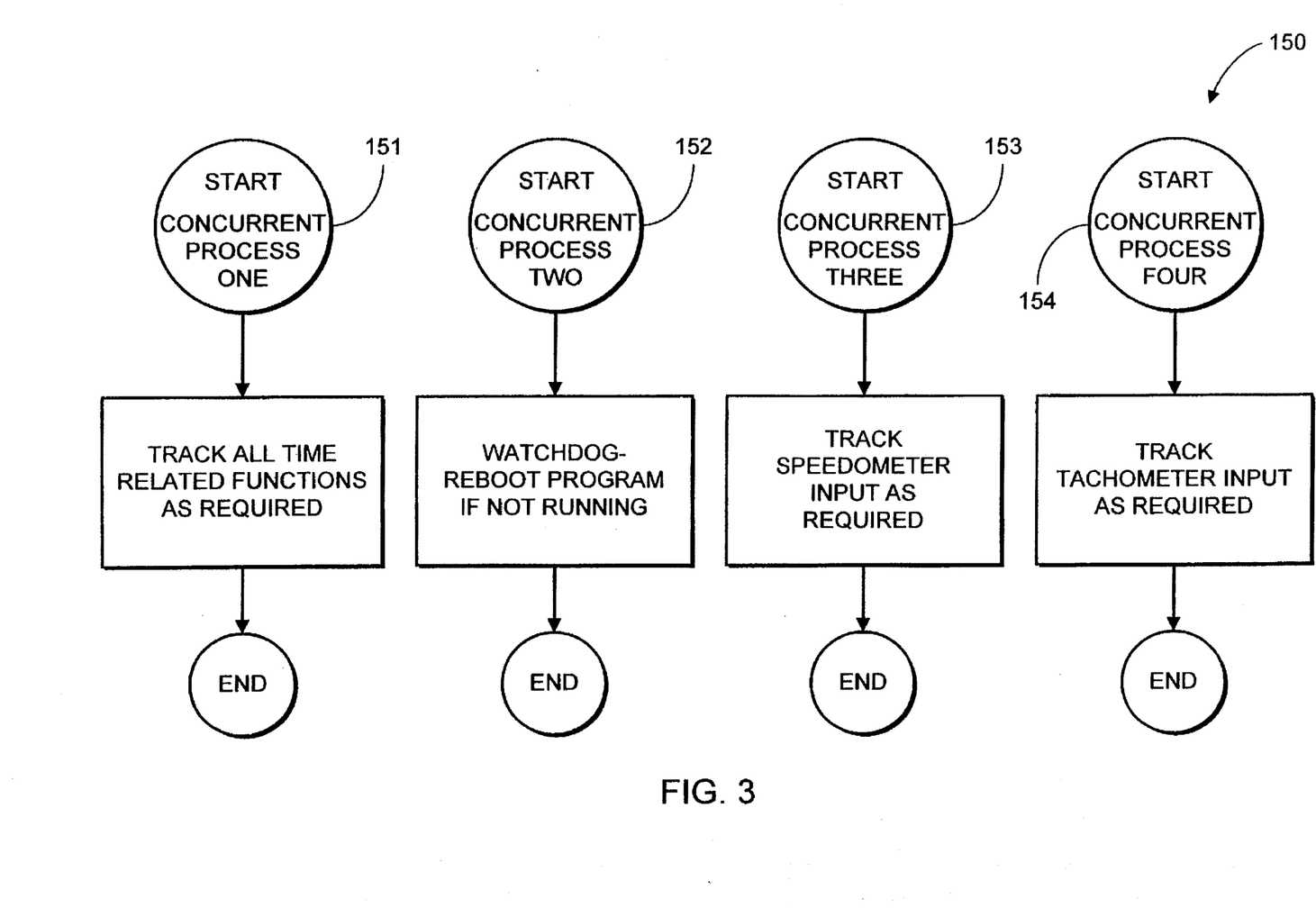
FIG. 3 is a flow diagram of concurrent process programming for tracking input and operation of the speedometer in FIG. 1.
Figure 4A:
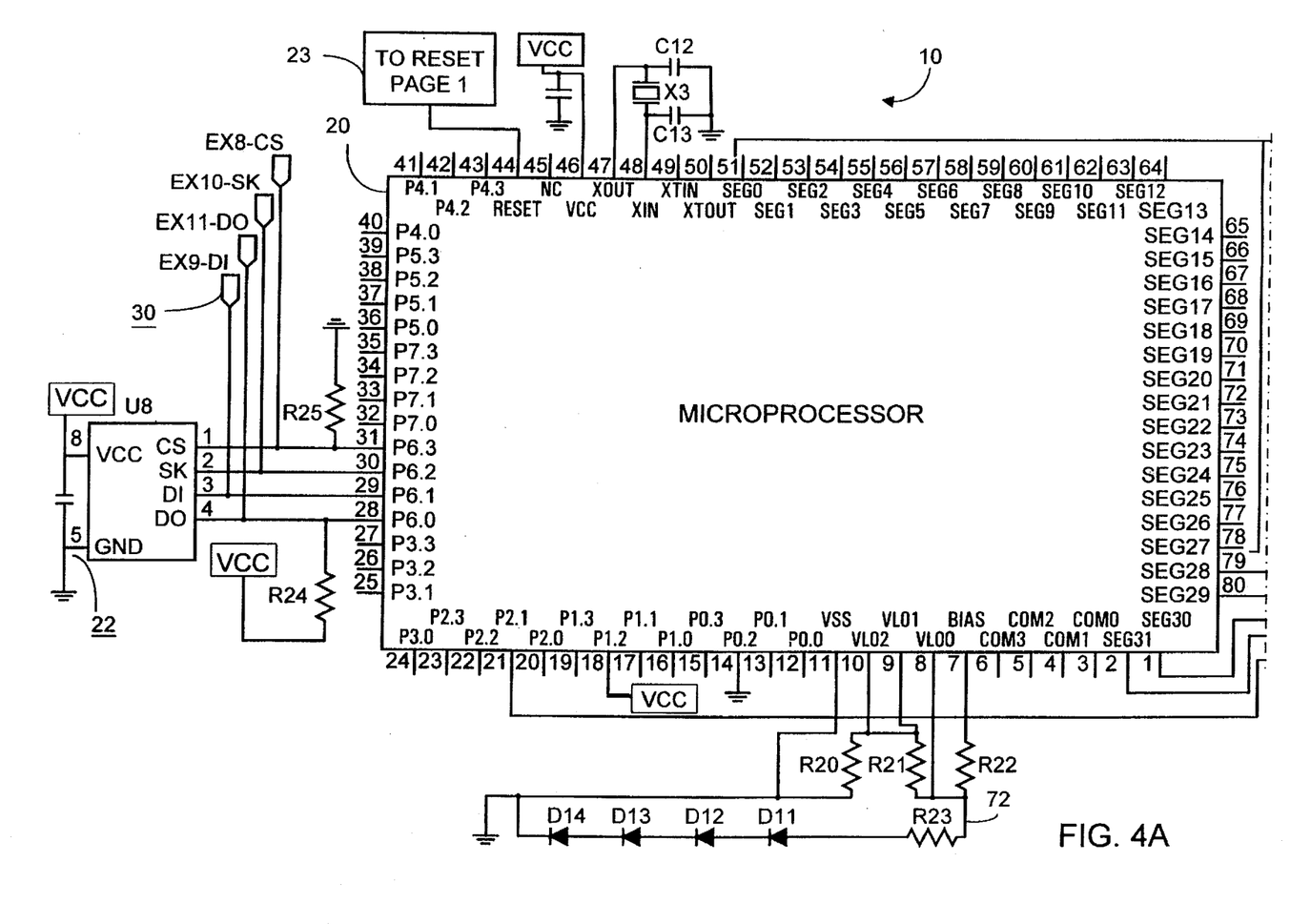
FIG. 4 is an electronic schematic diagram of the speedometer of FIG. 1, in accordance with one aspect of the present invention.
Figure 4B:
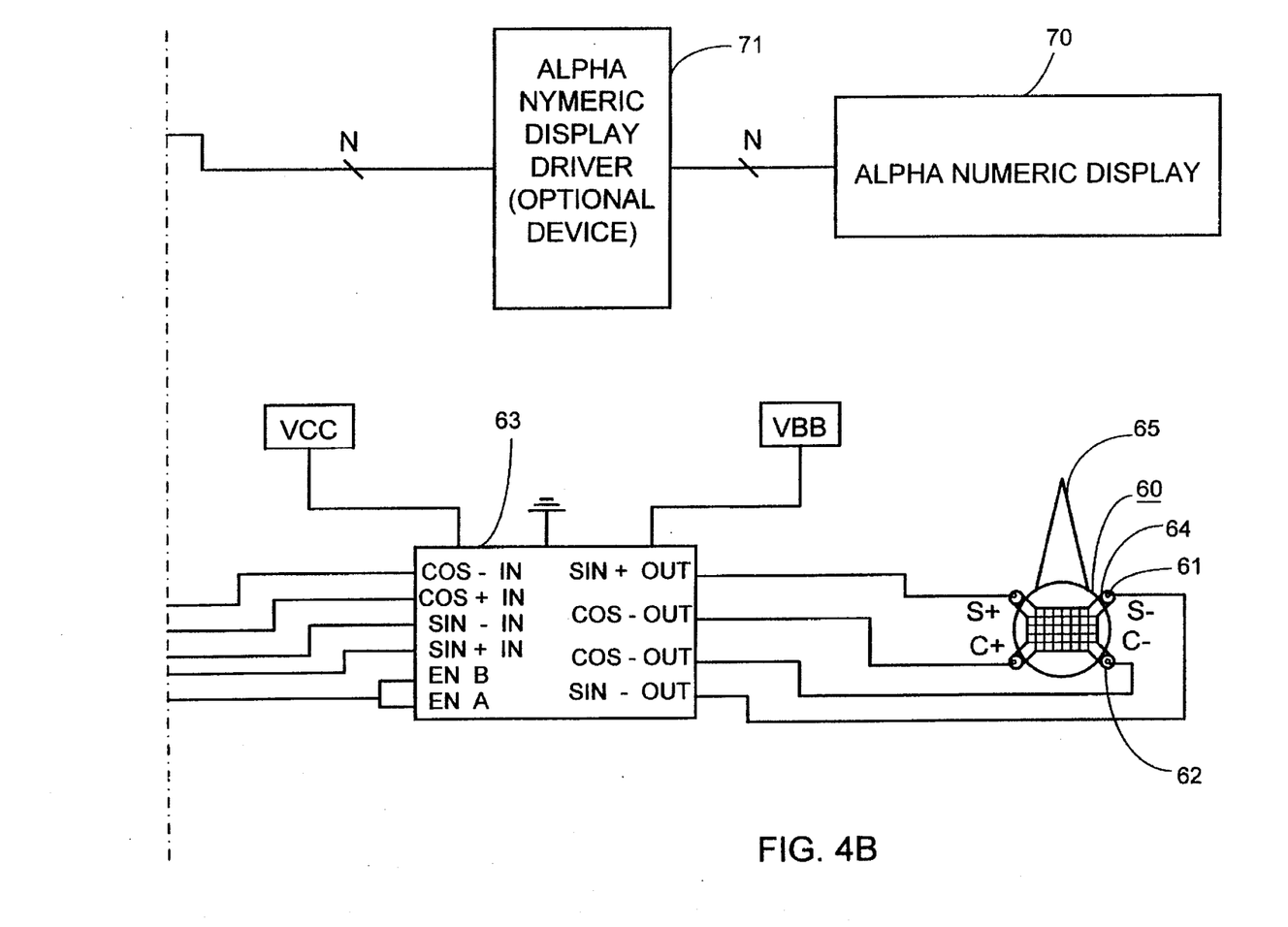

Input and operation of the present invention is tracked by concurrent process programming 150, as shown in FIG. 3. In one embodiment, four concurrent processes are provided (steps 151, 152, 153, 154). Concurrent process one (step 151), for instance, tracks all time related functions, as required. Concurrent process two (step 152) comprises "watchdog" programming for tracking program operation and rebooting such programming if it is found not running or nonoperational. Speedometer and tachometer input are tracked by concurrent processes three (step 153) and four (step 154), respectively.

"Watchdog" programming preferably runs independently of the main process and on a timed basis, e.g., every ¼ second, adding 1 to a counter upon each run. An objective is to restart the main process, should it fail. When the counter reaches a set value, e.g., 4, this "watchdog" causes the main program to REBOOT, i.e., jump to its first instruction. The main process is structured to set the counter to zero before it reaches 4. Hence, failure to do so indicates main process failure.

Turning now to another aspect of the present invention, as set forth in FIG. 2B, a variety of functions are provided by the speedometer and, more particularly, microprocessor programming. In accordance with one aspect of the invention is a first speed. function 160 which at relatively high input signal frequencies determines vehicle speed by integrating pulses with respect to time. A second speed function 161 is provided which determines vehicle speed at relatively low input signal frequencies by measuring the time per cycle and inverting the measured value.

During speedometer programming, the microprocessor determines which speed function to use, based upon a selected break point. The break point is a function of pulses per unit distance and maximum dial angle at maximum speed. In this manner, the microprocessor converts the input signal to a measure of period or frequency, then updates that measure frequently so that there is no perceptible pointer hesitation. Provision of two speed functions has been found advantageous for maintaining an accurate display of speed over a relatively broad range of input frequencies.

The measured value is first enhanced by zero linearization pointer data provided for the particular speedometer unit. Any offsets required are, in addition, factored into the resultant value. The resultant value is processed by another algorithm which derives the SINE and COSINE of the desired pointer angle. The SINE and COSINE determine the duty cycle for applying power to each of the meter coils. A final linearization constant, determined upon assembly, is added to the COSINE to minimize any effects from the return magnet. The microprocessor then sends the SINE and COSINE values to the speedometer coil amplifiers to correctly position the pointer to indicate speed.

Concurrently therewith, a tachometer function 170 may be provided to display revolutions per minute (RPM's) of the vehicle engine. When the tachometer mode is selected, RPM's may be displayed on the dial pointer using the mode switch.

Another feature of the present invention is a main odometer function 180. This function is based on the number of pulses input with 0.01 unit distance resolution. The odometer value is updated at regular intervals, and when the vehicle speed equals. zero, to multiple copies in the EEPROM and when the vehicle speed equals zero. ALNUD display of this function is selected using the mode switch.

A further aspect of speedometer programming is a trip odometer function 190. This function is preferably separate from the main odometer function, and allows the operator to observe on a trip odometer 191 shown on the ALNUD the distance traveled by the vehicle from a selected START point. This display is also selected using the mode switch.

To reset the trip odometer, the mode switch is depressed for approximately one second. This activates a trip reset function 192 which clears or resets the trip odometer reading to zero, permitting the operator to initiate a new distance measurement. The trip odometer may be reset at any time during speedometer operation, whether the ALNUD is showing "TRIP ODOMETER", "MAIN ODOMETER" or "HOUR-METER" information.

Yet another feature of the speedometer is an hour-meter function 200. This function is programmable as an elapsed time indicator or as a motor run time indicator. Alternatively, dual indicator operation programming is considered within the spirit and scope of the present invention. A resolution of 0.01 hours is used. To activate the hour-meter function, the operator uses the mode switch to select the hour-meter data on the ALNUD. The display includes an active run indicator, and the function is updated regularly in substantially the same manner as the main odometer function.

In addition, a service interval function 210 is featured. This function is programmable by the operator. More particularly, the operator uses the mode switch to select the desired service interval in hours or miles, e.g., 25 hours or 1500 miles, and the basis for the interval, i.e., the elapsed time or distance. Once the service interval has elapsed, measurement of another service interval begins, a service interval alarm is turned "ON", and "SERVICE" is displayed on the ALNUD for a selected duration each hour, e.g., about 6 minutes.

A service interval alarm reset function 211 resets the service interval alarm, i.e., turns the alarm "OFF" and clears the ALNUD indication. This function may be activated during speedometer operation using the mode switch, e.g., during display of "SERVICE"

A record function 220 may also be provided which gathers pointer data for later replay. The operator is given various options for observing the pointer, for instance, at ¼, ½ or actual data collection speed. When "RECORD" is shown on the ALNUD, the operator uses the mode switch to set up this function. After a programmed delay, e.g., about four seconds, the first non-zero pointer indication initiates recording until the elapsed time (determined by EEPROM capacity, which is variable) has passed. This delay allows the user to pass the "RECORD" function by again depressing the mode switch. This permits the user to go on to the next function. Normal operation then resumes.

To replay the speed and distance data in real-time, ½ or ¼ speed, a "REPLAY" function 230 is provided. The operator uses the mode switch to rotate through the display mode until the ALNUD shows "REPLAY". After another programmed delay, e.g., of about four seconds, the ALNUD slowly rotates through the following displays: "1:1", "1:2", "1:4". Engagement of the mode switch during this display selects and initiates the replay of stored pointer information at the displayed speed. When complete, the ALNUD returns to the "REPLAY" display.

Turning now to a further aspect of the present invention is a dual function 240 which allows the microprocessor to support both the operation and display of the speedometer and tachometer simultaneously, i.e., using dual inputs. For instance, when the speedometer mode is selected using the mode switch, the pointer displays speed and the ALNUD displays RPM's. When the tachometer mode is selected, also using the mode switch, the pointer displays RPM's and the ALNUD shows speed.

The present invention is also advantageous in providing a self-calibration function 250. During this mode of operation, the vehicle is driven over a selected measured distance (mile or kilometer) to recalibrate speedometer operations. The function is initialized by depressing the mode switch for 0.01 hours (36 seconds). The ALNUD then indicates "READY", and the operator momentarily depresses the mode switch at the start of the measured mile, e.g., a selected mile marker observed along the roadway, and again at the end, e.g., the next observed mile marker. This distance data is sent to the EEPROM to update or reprogram the microprocessor with more accurate data for determining speed and distance traveled. Normal operation is then resumed.

Figure 6:
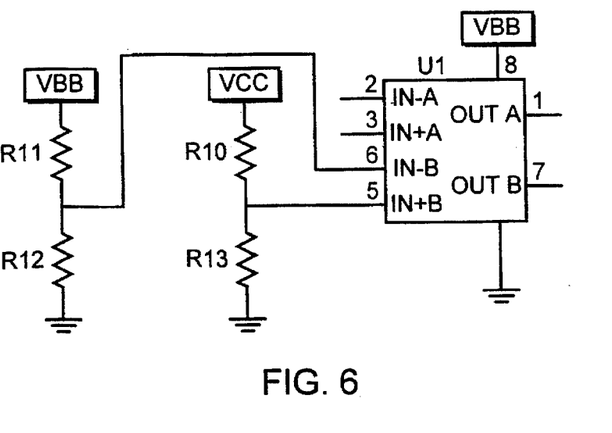
FIG. 6 is a schematic diagram of a voltage comparator circuit, in accordance with one aspect of the present invention.

To facilitate operation of update programming, such as updating EEPROM data during operation, a voltage comparator circuit is provided, as shown in FIG. 6. This circuit determines whether there is sufficient power to reliably update EEPROM data for a selected function. If voltage is too low, system operation continues but a low voltage warning is sent to the microprocessor which postpones the EEPROM update until sufficient power is available. Power is checked prior to each update.

Still another programming option is a minimum indication function 260. When speed readings fall below a selected minimum value or pointer position on the speedometer, this function moves the pointer to indicate zero or the minimum set point.

A positive pointer movement direction function 270 is a further option available with the present invention. This programming option enables positive dial pointer movement in either the clockwise or counter-clockwise direction.

Figure 13:
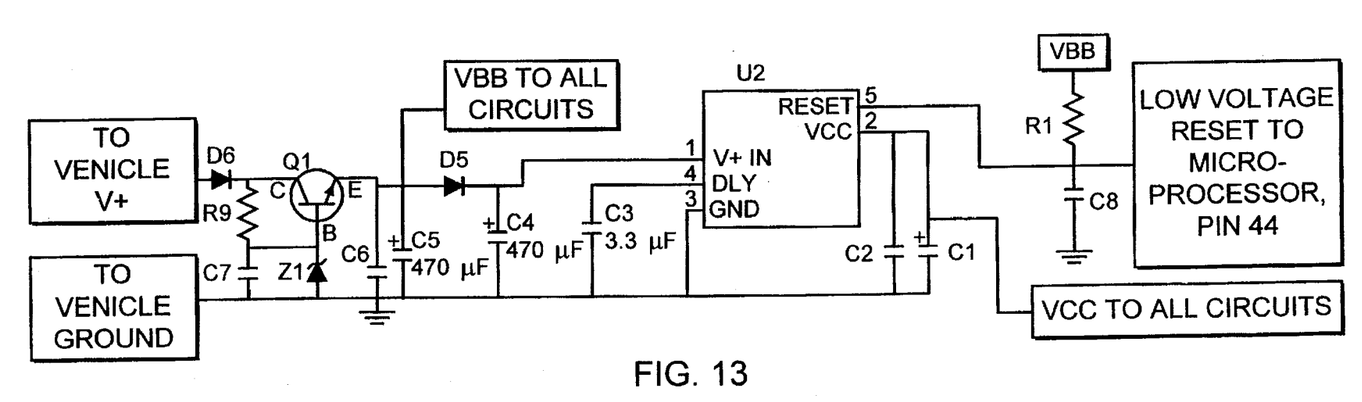
FIG. 13 is a schematic diagram of a power supply circuit for the multifunction speedometer of FIG. 2.

In operation, when power is supplied to the speedometer, such as through the voltage supply circuit shown in FIG. 13, a START boot process (step 280) begins and the microprocessor commences execution of an initialization algorithm. This algorithm initializes (step 281) all internal and external hardware, and critical data from the EEPROM including but not limited to PPD, integration time (Window), linearization offsets, linearization constants, odometer and hour-meter information, as demonstrated in FIG. 2.

Next, data is read (step 282) from the EEPROM and data integrity checks are performed. Data integrity is relatively important to proper device operation and is maintained by a dynamic CHECKSUM function which provides for multiple correct reads. Odometer and hour-meter information is loaded from multiple copies in the EEPROM, each being checked against the other. Any data read or copy in error is corrected before the process continues. Software is then initialized (step 283) and concurrent processing is enabled (step 284). When complete, the device is fully operational, i.e., to START the main process (step 290).

Items failing to be read correctly do not necessarily prevent the device from functioning. Preferably, only those functions that depend on misread data are inhibited. Meanwhile, the device continues to run, supporting the other functions while periodically attempting to read the missing data correctly until all required data has been read. When this occurs, the inhibited function is reenabled.

Upon START of the main process, speedometer programming provides for conversion of speed and distance data (step 291). Programming then provides for modification and storage of data to the EEPROM of hour-meter data (step 292), trip odometer data (step 293), main odometer data (step 294), display mode data (step 295), and service interval data (step 298). "Watchdog" programming (step 300) resets the process and returns to START main process (step 290).

A specific, illustrative electronic schematic of a programmable multifunction speedometer, in accordance with the present invention, is shown in FIG. 4. At the kernel is the microprocessor integrated with multiple input and data display devices. The display aspect of the system includes alpha numeric display 70, with optional driver 71 and bias circuits 72, and meter 60 with dial 64 and pointer 65 having a signal amplifier and pointer control unit or amplifier/controller 63. Input is provided through EEPROM memory device 22 integrated with PC programming, and by user programming.

Figure 5:
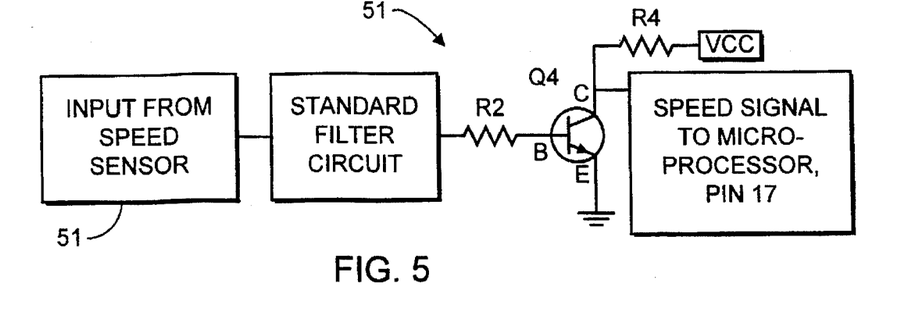
FIG. 5 is an schematic diagram of a circuit for shifting compatibility of pulse train input from the speed sensor of FIG. 1 to a speed signal for input to the microprocessor.
Figure 7:
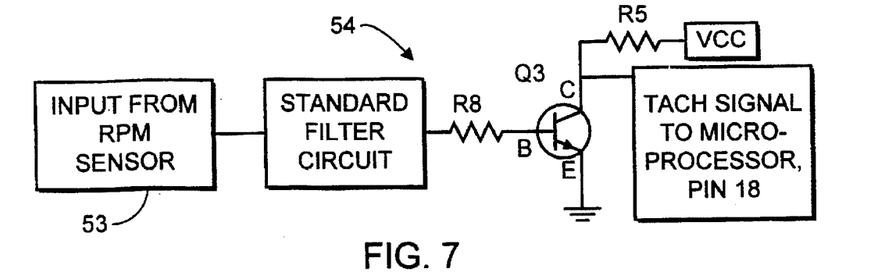
FIG. 7 is a schematic diagram of a circuit for shifting compatibility of pulse train input from the RPM sensor of FIG. to a tachometer signal for input to the microprocessor.

As shown in FIG. 5, electrical signal 55 from speedometer sensor 50 is sent through the input circuit or buffer 51 which filters out relatively high frequencies (e.g., about 8 KHz or greater). This is done to prevent erroneous or non-device signals from affecting the speedometer. It also modifies the signal for electrical compatibility with the microprocessor. This signal is used to determine speed and to monitor distance. A similar arrangement is provided for signal input 53 from RPM sensor 56 using filter circuit or buffer 54, as shown in FIG. 7.

Figure 9:
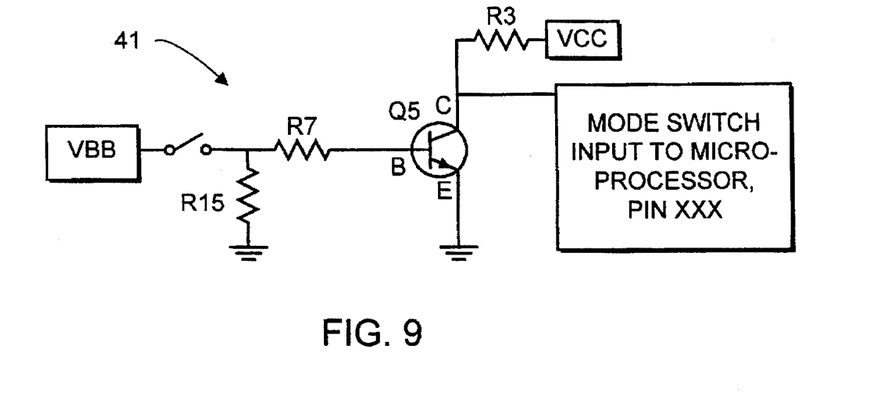
FIG. 9 is a schematic diagram of a mode switch, in accordance with one aspect of the invention.

The electrical signal from mode switch 40 shown in FIG. 9 is used variously for changing modes, resetting the trip odometer display, and service interval alarm display, and for data input to program the various options available to the operator.

Figure 8:
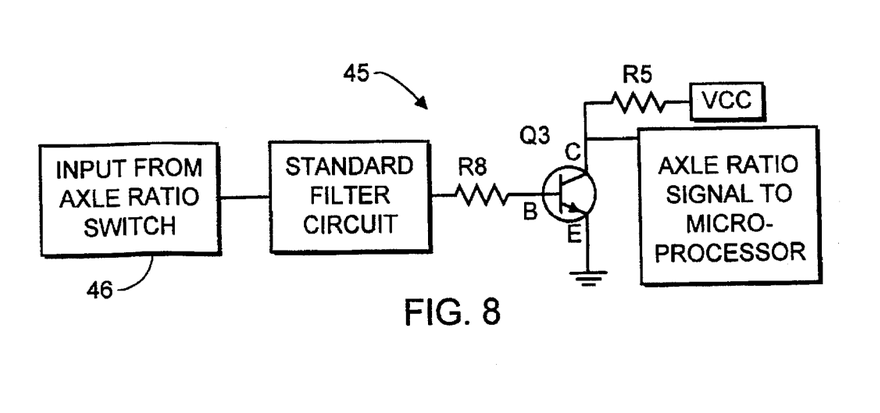
FIG. 8 is a schematic diagram of a circuit for shifting compatibility of pulse train input from the axle ratio switch of FIG. 1 to an axle ratio signal for input to the microprocessor.

The electrical signal 47 from a buffer 45 and vehicle supplied, low axle ratio switch 46 indicates that the lower axle ratio of a two-speed axle is engaged, as best seen in FIG. 8. This causes the microprocessor to use a second set of PPD's and windows, which are programmed during production. In this signal's absence, the microprocessor uses the primary set, which is the normal mode for a single speed axle. Each set is always available, neither precluding the other.

The electrical signals from the programming probe are generated by a computer for initializing the EEPROM. This is generally done during production.

A microprocessor reset 23, as shown in FIG. 4, effects hardware signal input to microprocessor 20 which causes the microprocessor to start at the first instruction in its programming (i.e., START boot process).

Figure 10:
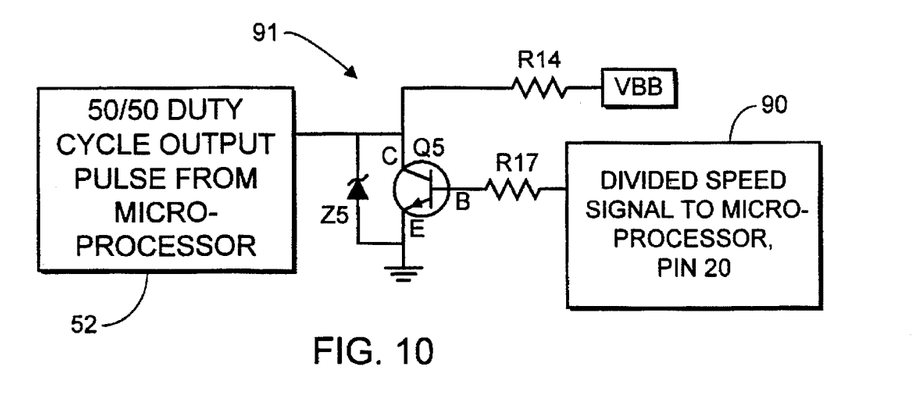
FIG. 10 is a schematic diagram of a signal generator circuit for shifting divided speed signal from the microprocessor to 50/50 duty cycle output.
Figure 11:
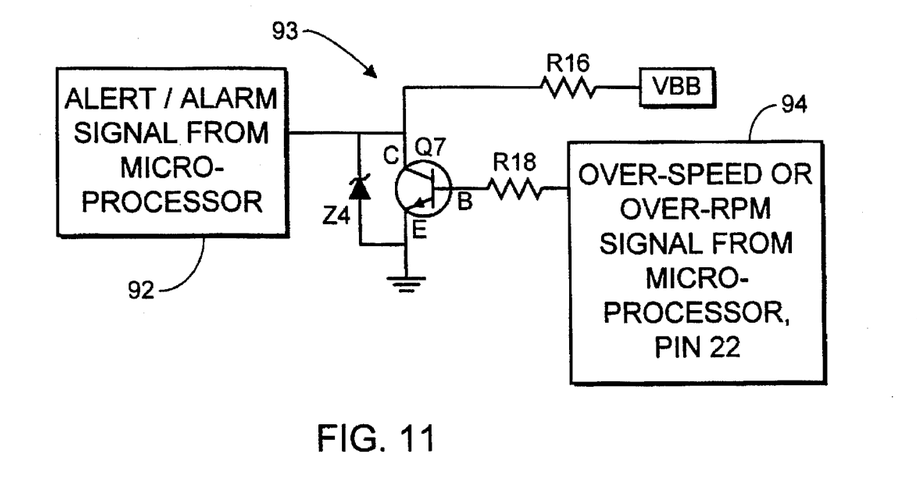
FIG. 11 is a schematic diagram of a signal generator circuit for shifting over-speed or over-RPM signals from the microprocessor to alert/alarm signals.
Figure 12:
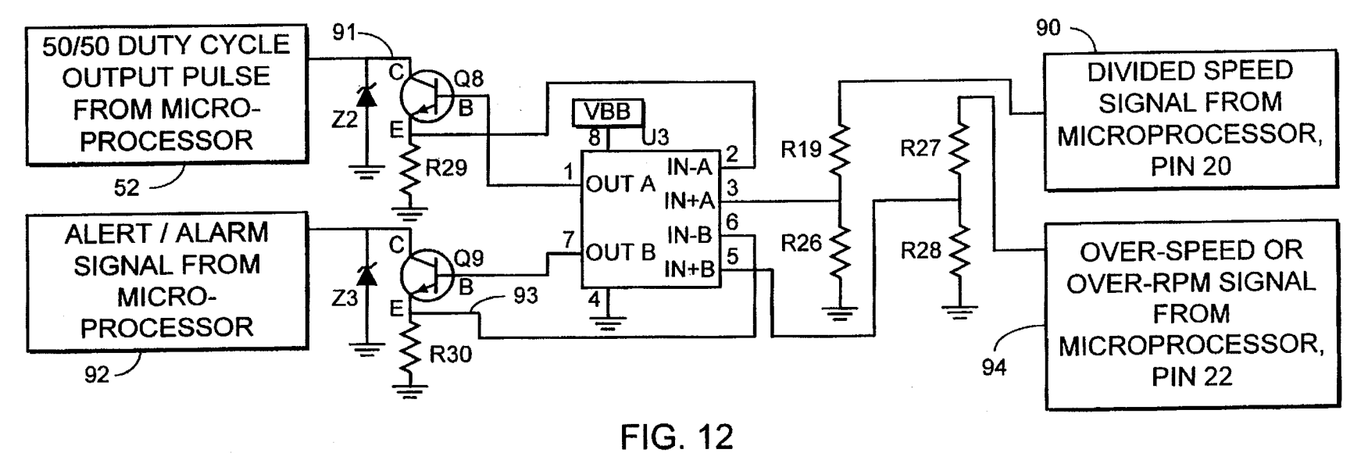
FIG. 12 is a schematic diagram of an alternative output circuit for protecting an output transistor upon shifting over-speed or over-RPM signals from the microprocessor to alert/alarm signals, and upon shifting divided speed signal from the microprocessor to 50/50 duty cycle output.

Referring now to FIGS. 10–12, the first output is an electrical signal proportional to speed but divided by a programmable number from the speed input signal. This is known as divided speed output 90 which also passes through a signal buffer 91 before final output 52. When the number of input pulses equals about one-half the divider number, the output changes state (50/50 duty cycle).

The second output is overspeed alarm signal output 92 triggered via buffer 93 whenever the speed is over a selected programmed overspeed point or signal 94. Alternatively, the second output is over-RPM alarm signal output 92 triggered via buffer 93 whenever the RPM's are over a selected programmed over-RPM point or signal 94.

Since from the foregoing the construction and advantages of the invention may be readily understood, further explanation is believed unnecessary. However, since numerous modifications will readily occur to those skilled in the art after consideration of the foregoing specification and accompanying drawings, it is not intended that the invention be limited to the exact construction shown and described, but all suitable modifications and equivalents may be resorted to which fall within the scope of the appended claims.

What is claimed is:

1. A programmable multifunction speedometer, wherein a sensor responding to drive train motion provides input pulses related to speed of vehicle travel, the pulses being input to a programmable microprocessor that has been programmed at least to drive an instantaneous and continuously correct display of speed, the microprocessor having a first input device for receiving programming from an external source, and a second input device for modifying programming during speedometer operation, the speedometer having multiple programming modes including a first mode for programming the microprocessor from the external source, a second mode for programming upon speedometer installation using mode switches, a third mode for programming during vehicle operation, a fourth mode of programming using multiposition selector switches, and a fifth mode for resetting a trip odometer of the speedometer during vehicle operation.

2. The speedometer set forth in claim 1 having a resettable odometer for display of distance data.

3. The speedometer set forth in claim 2, wherein the programming has a service interval function programmable to select the frequency and duration of service interval data display.

4. The speedometer set forth in claim 1, wherein the programming has a time-meter function programmable for display of selected time elapsed.

5. The speedometer set forth in claim 1, wherein the programming has a data record function for storing speed data.

6. The speedometer set forth in claim 5, wherein the programming has a data replay function programmable for selected time-sequence display of the stored speed data.

7. The speedometer set forth in claim 1, wherein the programming has a data record function for storing RPM data.

8. The speedometer set forth in claim 7, wherein the programming has a data replay function programmable for selected time-sequence display of the stored RPM data.

9. The speedometer set forth in claim 1, wherein the programming has a dual function mode for the simultaneous reception and display of speed and RPM data.

10. The speedometer set forth in claim 1, wherein the programming has a self-calibrating mode operated by a manual switch to start and stop a counted succession of the input pulses.

11. The speedometer set forth in claim 10, wherein the programming has a pointer movement direction function for positive pointer movement in clockwise and counterclockwise directions.

12. The speedometer set forth in claim 10 having a return magnet for maintaining the pointer at zero when power is "OFF" and when the vehicle is at rest.

13. The speedometer set forth in claim 12 wherein the programming has a function for measuring and counteracting the return magnet.

14. The speedometer set forth in claim 1, wherein the programming has a minimum indication function for displaying zero speed for speed data below a selected minimum value.

15. The speedometer set forth in claim 1 having a pointer display for indicating speed.

16. The speedometer set forth in claim 1 wherein the programming has a first speed function which at relatively high speeds determines speed by integrating pulses with respect to time and a second speed function which at relatively low speeds determines speed by measuring the time between pulses and inverting the measured value.

17. The speedometer set forth in claim 1 wherein the fifth mode is provided for resetting a service interval alarm of the speedometer during vehicle operation.

18. A programmable multifunction speedometer, wherein a sensor responding to drive train motion provides input pulses related to speed of vehicle travel, the pulses being input to a programmable microprocessor that has been programmed at least to drive an instantaneous and continuously correct display of speed, the speedometer having multiple programming modes including a first mode for programming the microprocessor from the external source, a second mode for programming upon speedometer installation using mode switches, a third mode for programming during vehicle operation operated by a manual switch to start and stop a counted succession of the input pulses, a fourth mode of programming using multiposition selector switches, and a fifth mode for resetting a trip odometer of the speedometer during vehicle operation.

19. A programmable multifunction speedometer, wherein a sensor responding to drive train motion provides input pulses related to speed of vehicle travel, the pulses being input to a programmable microprocessor that has been programmed at least to drive an instantaneous and continuously correct display of speed, the microprocessor having a first input device for receiving programming from an external source, and a second input device for modifying programming during speedometer operation, the programming having a data record function for storing speed data and a data replay function programmable for selected time-sequence display of the stored speed data.

20. A programmable multifunction speedometer, wherein a sensor responding to drive train motion provides input pulses related to speed of vehicle travel, the pulses being input to a programmable microprocessor that has been programmed at least to drive an instantaneous and continuously correct display of speed, the microprocessor having a first input device for receiving programming from an external source, and a second input device for modifying programming during speedometer operation, the programming having a data record function for storing RPM data and a data replay function programmable for selected time-sequence display of the stored RPM data.

* * * * *